US010927812B2

(12) United States Patent
Kammer (10) Patent No.: US 10,927,812 B2
(45) Date of Patent: Feb. 23, 2021

(54) METHOD OF DYNAMICALLY ADJUSTING A RATE OF CHANGE OF A ROTOR SPEED SET POINT DURING WIND TURBINE SHUTDOWN

(71) Applicant: General Electric Company, Schenectady, NY (US)

(72) Inventor: Leonardo Cesar Kammer, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 66 days.

(21) Appl. No.: 16/278,987

(22) Filed: Feb. 19, 2019

(65) Prior Publication Data

US 2020/0263662 A1    Aug. 20, 2020

(51) Int. Cl.
*F03D 7/02*    (2006.01)

(52) U.S. Cl.
CPC ......... *F03D 7/0264* (2013.01); *F03D 7/0276* (2013.01); *F05B 2260/90* (2013.01); *F05B 2270/101* (2013.01)

(58) Field of Classification Search
CPC .... F03D 7/0264; F03D 7/0276; F03D 7/0296; F03D 7/043; F05B 2260/90; F05B 2270/101; F05B 2270/309; F05B 2270/327; F05B 2270/334
See application file for complete search history.

(56) References Cited

U.S. PATENT DOCUMENTS

| 4,193,005 | A  | * | 3/1980  | Kos ........................... H02P 9/04 290/44 |
| 7,755,210 | B2 | * | 7/2010  | Kammer .............. F03D 7/0224 290/44 |
| 8,044,529 | B2 | * | 10/2011 | Egedal ................. F03D 7/0224 290/44 |
| 9,447,778 | B2 | * | 9/2016  | Caponetti ................ F03G 7/00 |
| 9,476,407 | B2 | * | 10/2016 | Pineda Amo ........... F03D 7/042 |
| 9,611,834 | B2 | * | 4/2017  | Esbensen .............. F03D 7/0224 |

(Continued)

FOREIGN PATENT DOCUMENTS

| EP | 0 008 584 A1 | 3/1980 |
| EP | 2 196 666 A1 | 6/2010 |
| WO | WO2018/033190 A1 | 2/2018 |

OTHER PUBLICATIONS

European Search Report for EP Application No. 20156938.1, dated Jun. 23, 2020.

*Primary Examiner* — Brian P Wolcott
(74) *Attorney, Agent, or Firm* — Dority & Manning, P.A.

(57) ABSTRACT

A method for operating a wind turbine includes operating, via a controller, the wind turbine according to a speed set point during normal operation of the wind turbine. The method also includes receiving, via the controller, a command to shut down the wind turbine or to curtail operation of the wind turbine. In response to receiving the command, the method includes initiating, via the controller, a shutdown procedure or a curtailment procedure of the wind turbine. During the shutdown procedure or the curtailment procedure of the wind turbine, the method includes dynamically adjusting a rate of change of the speed set point as a function of a speed tracking error, which corresponds to a difference between an actual rotor speed of the wind turbine and the speed set point.

16 Claims, 6 Drawing Sheets

(56) References Cited

U.S. PATENT DOCUMENTS

| | | | | |
|---|---|---|---|---|
| 9,726,147 B2* | 8/2017 | Huang | | F03D 17/00 |
| 10,145,361 B2* | 12/2018 | Agarwal | | F03D 7/0296 |
| 10,161,383 B2* | 12/2018 | Pineda Amo | | F03D 7/042 |
| 10,240,581 B2* | 3/2019 | Zheng | | F03D 7/0224 |
| 10,612,518 B2* | 4/2020 | Niss | | F03D 7/0272 |
| 2011/0305568 A1 | 12/2011 | Brath et al. | | |
| 2012/0139240 A1* | 6/2012 | Otamendi Claramunt | | F03D 7/043 |
| | | | | 290/44 |
| 2015/0377215 A1* | 12/2015 | Agarwal | | F03D 7/0276 |
| | | | | 416/1 |
| 2018/0187651 A1* | 7/2018 | Frydendal | | F03D 17/00 |
| 2019/0203692 A1* | 7/2019 | Caponetti | | F03D 7/043 |

* cited by examiner

METHOD OF DYNAMICALLY ADJUSTING A RATE OF CHANGE OF A ROTOR SPEED SET POINT DURING WIND TURBINE SHUTDOWN

FIELD

The present invention relates generally to wind turbines, and more particularly, to systems and methods for dynamically adjusting a rate of change of a rotor speed set point of the wind turbine during shutdown.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During wind turbine operation, there are various scenarios that require the wind turbine to be shut down. Such shutdown scenarios may occur, for example, due to regularly-scheduled maintenance, blade pitch faults, fatigue loading, extreme loading, grid events, and/or converter trips. Conventional wind turbine controllers use a constant ramp rate for reducing the rotor speed set point during wind turbine shutdown. As such, the rotor speed set point ramps down according to the constant ramp rate to force the controller to take actions to reduce the actual rotor speed of the wind turbine. The constant ramp rate, however, fails to address potential stresses/loading of the wind turbine during the shutdown period.

Accordingly, an improved system and method for dynamically adjusting the ramp rate of the rotor speed set point of the wind turbine during shutdown so as to maintain the structural loads within acceptable levels would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for operating a wind turbine. The method includes initiating, via the controller, a shutdown procedure or a curtailment procedure of the wind turbine. During the shutdown procedure or the curtailment procedure of the wind turbine, the method includes dynamically adjusting a rate of change of a rotor speed set point as a function of a rotor-speed tracking error, the rotor-speed tracking error being equal to a difference between an actual speed of the wind turbine and the rotor speed set point.

In one embodiment, for example, the actual speed of the wind turbine may correspond to the actual rotor speed. In such embodiments, the method may include determining the actual rotor speed of the wind turbine by measuring, via one or more sensors, a generator speed of the wind turbine and dividing the generator speed by a gearbox ratio of a gearbox of the wind turbine.

In another embodiment, dynamically adjusting the rate of change of the speed set point as a function of the speed tracking error may include decreasing the rate of change of the speed set point from an initial rate of change to a reduced rate of change when the actual rotor speed is greater than the speed set point. In such embodiments, the method may also include limiting the decreasing of the rate of change of the speed set point to a predetermined minimum value. In addition, the method may further include increasing the reduced rate of change of the speed set point to the initial rate of change when the actual rotor speed approaches the speed set point so as to expedite a stopping of a rotor of the wind turbine.

In further embodiments, dynamically adjusting the rate of change of the speed set point as a function of the speed tracking error may include maintaining the rate of change of the speed set point at an initial rate of change when the actual rotor speed is equal to the speed set point. Similarly, in additional embodiments, dynamically adjusting the rate of change of the speed set point as a function of the speed tracking error further comprises maintaining the rate of change of the speed set point at an initial rate of change when the actual rotor speed is less than the speed set point.

In particular embodiments, the speed set point may be a rotor speed set point, a generator speed set point, or a rotational speed set point within a gearbox of the wind turbine.

In another aspect, the present disclosure is directed to a system for operating a wind turbine. The system includes a controller having at least one processor. The processor is configured to perform a plurality of operations, including but not limited to initiating a shutdown procedure or a curtailment procedure of the wind turbine and during the shutdown procedure or the curtailment procedure of the wind turbine, dynamically adjusting a rate of change of the speed set point as a function of a speed tracking error. It should be understood that the system may be further configured to implement any of the additional steps and/or may include any of the additional features as described herein.

In yet another aspect, the present disclosure is directed to a method for shutting down or curtailing a wind turbine. During normal operation of the wind turbine, the method includes operating, via a controller, the wind turbine according to a speed set point. The method also includes receiving, via the controller, a command to shut down the wind turbine or to curtail operation of the wind turbine. In response to receiving the command, the method includes initiating, via the controller, a shutdown procedure or a curtailment procedure of the wind turbine. During the shutdown procedure or the curtailment procedure of the wind turbine, the method includes dynamically adjusting a rate of change of the speed set point as a function of a speed tracking error, which corresponds to a difference between an actual rotor speed of the wind turbine and the speed set point. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Some of the braking procedures used during a wind turbine shutdown procedure use closed-loop controls to track the speed set point. At the start of a shutdown procedure, the initial rotor-speed response depends on the circumstances that triggered that shutdown. In one extreme, a fault in one of the rotor blades may prevent this blade from pitching while the other blades must pitch towards feather to bring the rotor speed down. On the opposite extreme, a grid fault may cause the loss of counter-torque such that the rotor speed starts increasing. Under all scenarios, the goal of a controlled shutdown is to provide a mechanism for safe reduction of the rotor speed, such that the structural loads on the tower, main shaft, rotor blades, and/or other components are mitigated.

Speed regulation is an important part of the turbine shutdown, but the pitch actuators also need to address structural loads during the shutdowns. If the rotor-speed set point ramps down too fast, while the rotor speed is still increasing due to a loss of counter-torque, then the aggressive pitch action may be harmful to the turbine tower, for instance. To mitigate this problem, the ramp rate of the speed set point can be configured to vary as a function of the speed tracking error. When the actual speed can keep up with the desired rate of speed reduction, then the speed set point continues ramping down at the original ramp rate. Otherwise, the rate of change in the speed set point reduces towards a minimum ramp rate.

Figure 1:
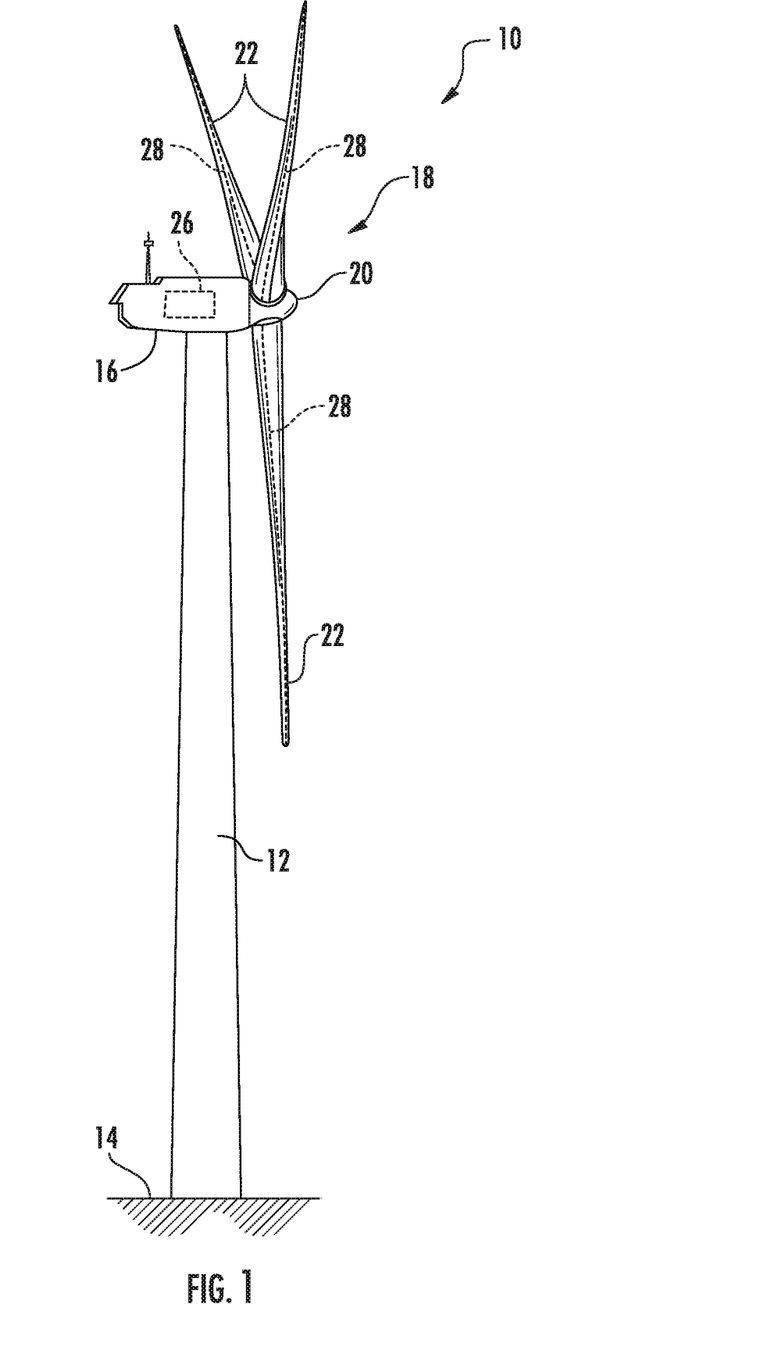
FIG. 1 illustrates a perspective view of one embodiment of a wind turbine according to the present disclosure.

Referring now to the drawings, FIG. 1 illustrates a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine operating signals. Accordingly, the controller 26 may generally be configured to control the various operating modes (e.g., start-up or shut-down sequences) and/or control various components of the wind turbine 10 as will be discussed in more detail below.

Figure 2:
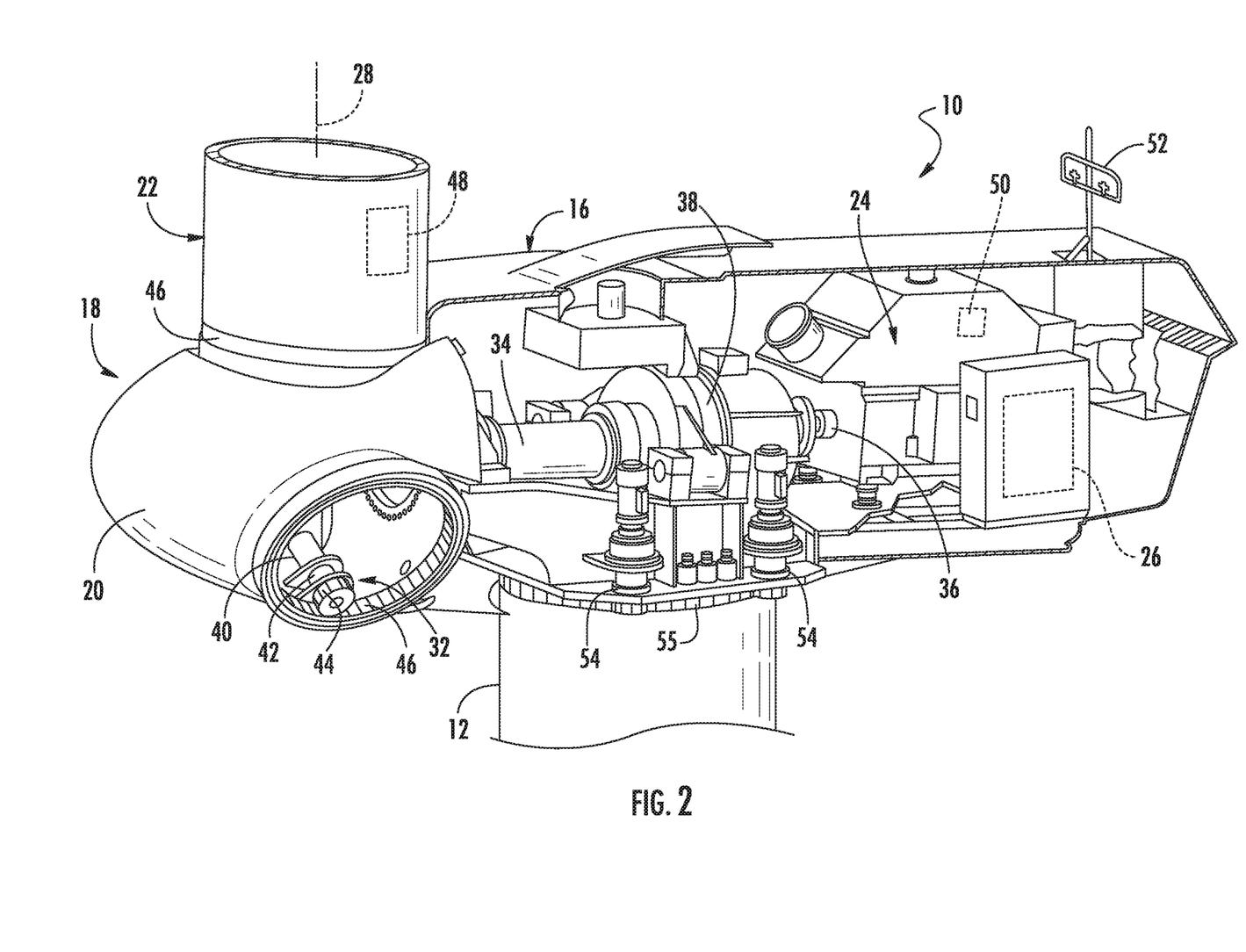
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 54 communicatively coupled to the controller 26, with each yaw drive mechanism(s) 54 being configured to change the angle of the nacelle 16 relative to the wind (e.g., by engaging a yaw bearing 55 of the wind turbine 10).

Still referring to FIG. 2, the wind turbine 10 may also include one or more sensors 48, 50, 52 for measuring various wind and/or wind turbine condition(s) as described herein. For example, in various embodiments, the sensors 48, 50, 52 may be wind parameter sensors configured to measure various wind parameters, such as wind speed, wind gusts, wind acceleration, wind veer, wind peaks, wind turbulence, wind shear, changes in wind direction, wakes, air density, or any other wind parameter. Further, the sensors 48, 50, 52 may be located at any suitable location on or around the wind turbine 10 (e.g. on the ground near the wind turbine 10, on the nacelle 16, or on a meteorological mast of the wind turbine 10) so as to measure various wind turbine parameters (such as rotor speed or generator speed). In addition, it should be understood that any number and/or type of sensors may be employed. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 3:
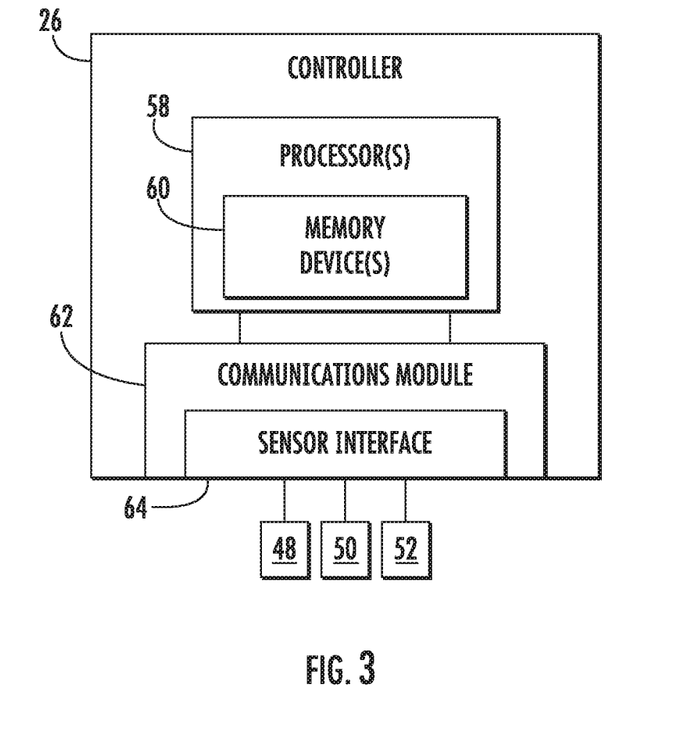
FIG. 3 illustrates a schematic diagram of one embodiment of a controller according to the present disclosure.

Referring now to FIG. 3, a block diagram of various components of the controller 26 according to the present disclosure is illustrated. As shown, the controller 26 may include one or more processor(s) 58, and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. For example, as shown, the communications module 62 may include a sensor interface 64 (e.g., one or more analog-to-digital converters) to permit signals transmitted from the sensors 48, 50, 52 to be converted into signals that can be understood and processed by the processor 58. It should be appreciated that the sensors 48, 50, 52 may be communicatively coupled to the communications module 62 using any suitable means. For example, as shown in FIG. 3, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions as described herein.

Figure 4:
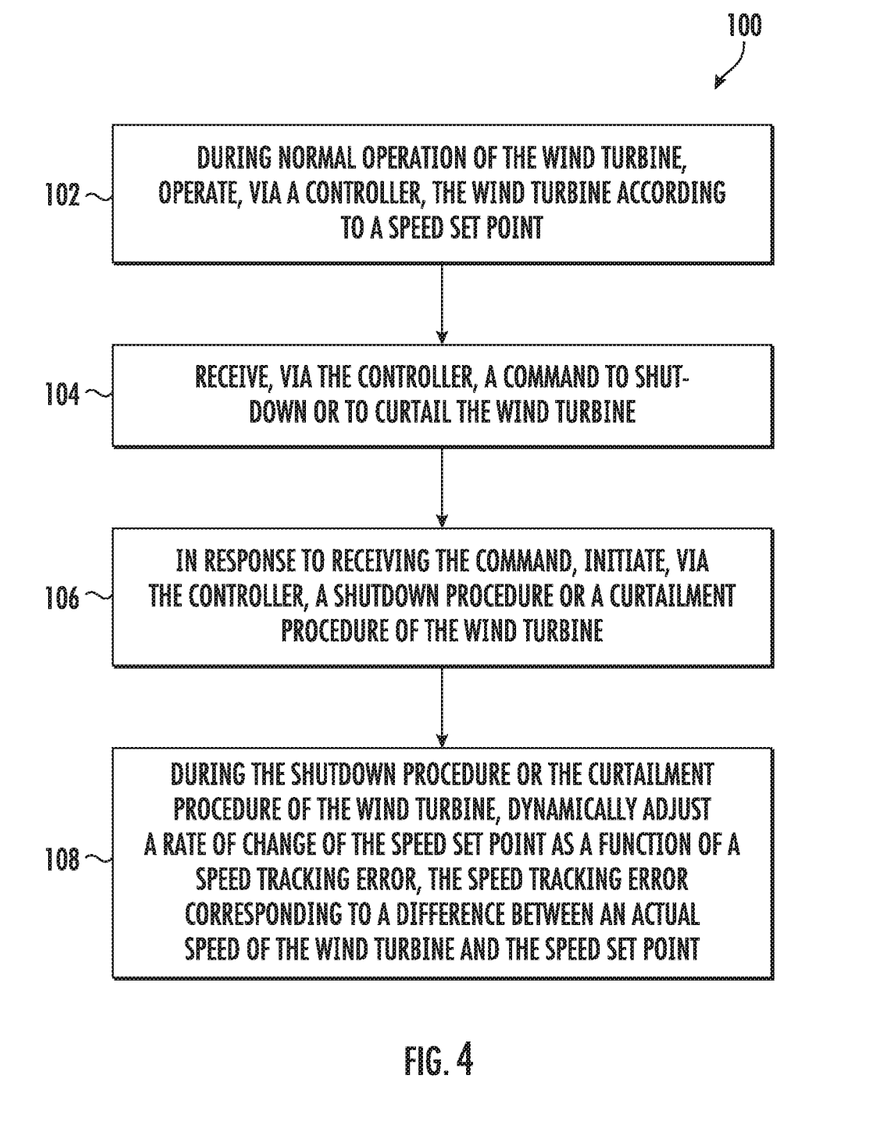
FIG. 4 illustrates a flow diagram of one embodiment of a method for operating a wind turbine during shutdown according to the present disclosure.

Referring now to FIG. 4, a flow chart of one embodiment of a method 100 for operating a wind turbine is illustrated. In general, the method 100 will be described herein with reference to the wind turbine 10 of FIGS. 1-3. However, it should be appreciated that the disclosed method 100 may be implemented with wind turbines having any other suitable configurations. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include operating, via the controller 26, the wind turbine 10 according to a speed set point during normal operation of the wind turbine 10. For example, in particular embodiments, the speed set point may be a rotor speed set point, a generator speed set point, or a rotational speed set point within a gearbox of the wind turbine 10. As shown at (104), the method 100 may include receiving, via the controller 26, a command to shut down the wind turbine 10 or to curtail operation of the wind turbine 10. In response to receiving the command, as shown at (106), the method 100 may include initiating, via the controller 26, a shutdown procedure or a curtailment procedure of the wind turbine 10. During the shutdown procedure or the curtailment procedure of the wind turbine 10, as shown at (108), the method 100 includes dynamically adjusting a rate of change of the speed set point as a function of a speed tracking error, which corresponds to a difference between an actual rotor speed of the wind turbine and the speed set point. Thus, in one embodiment, the method 100 may also include measuring the actual rotor speed via one or more of the sensors 48, 50, 52.

Figure 5:
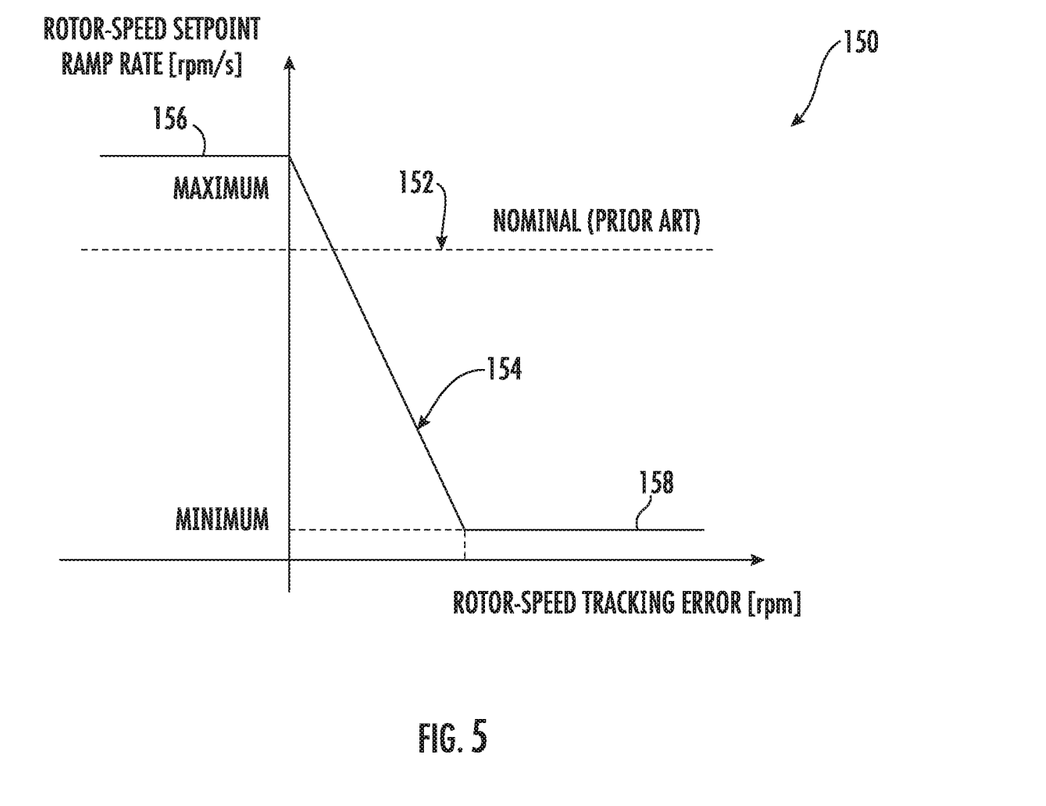
FIG. 5 illustrates a graph of the rotor-speed set point ramp rate in rpm/second (y-axis) versus the rotor-speed tracking error in rpm (x-axis)

The method 100 of the present disclosure can be better understood with respect to FIG. 5. As shown, FIG. 5 illustrates a graph 150 of the rotor-speed set point ramp rate (also referred to herein as the rate of change) in rpm/second (y-axis) versus the rotor-speed tracking error in rpm (x-axis). Further, as shown, conventional shutdown procedures implemented a constant, nominal ramp rate 152. In contrast, the rotor-speed set point ramp rate 154 of the present disclosure varies as a function of the rotor-speed tracking error. In addition, as shown, the rotor-speed set point ramp rate 154 of the present disclosure is ramped down from an initial, maximum ramp rate 156 to a minimum ramp rate 158.

Accordingly, in certain embodiments, the controller 26 may be configured to dynamically adjust the rate of change of the rotor speed set point by decreasing the rate of change of the rotor speed set point from an initial rate of change (e.g. the maximum ramp rate 156) to a reduced rate of change (e.g. the minimum ramp rate 158) when the actual rotor speed is greater than the rotor speed set point. In such embodiments, the method 100 may also include limiting the decreasing of the rate of change of the rotor speed set point to a predetermined minimum value (i.e. the value represented by 158). In addition, in further embodiments, the method 100 may further include increasing the reduced rate of change of the rotor speed set point back to the initial rate of change when the actual rotor speed approaches the speed set point so as to expedite a stopping of a rotor of the wind turbine 10.

In further embodiments, the controller 26 may be configured to dynamically adjust the rate of change of the speed set point by maintaining the rate of change of the speed set point at an initial rate of change (e.g. the maximum ramp rate 156) when the actual rotor speed is equal to the speed set point. Similarly, in additional embodiments, the controller 26 may be configured to dynamically adjust the rate of change of the speed set point by maintaining the rate of change of the speed set point at an initial rate of change when the actual rotor speed is less than the speed set point.

Figure 6:
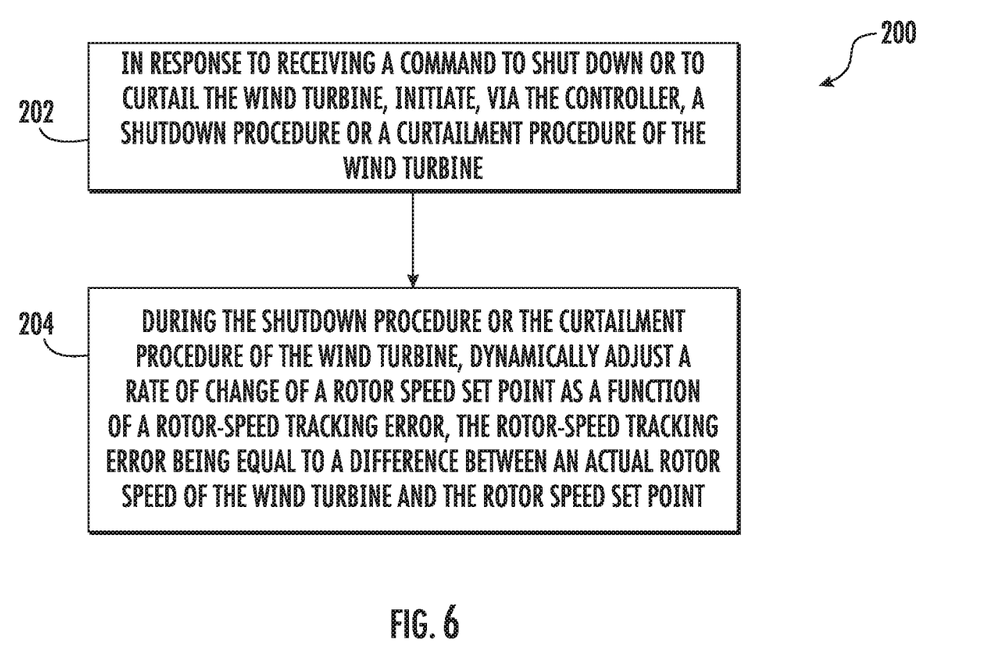
FIG. 6 illustrates a flow diagram of one embodiment of a method for shutting down or curtailing a wind turbine according to the present disclosure.

Referring now to FIG. 6, a flow chart of one embodiment of a method 200 for shutting down or curtailing a wind turbine is illustrated. In general, the method 200 will be described herein with reference to the wind turbine 10 of FIGS. 1-3. However, it should be appreciated that the disclosed method 200 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include initiating, via the controller 26, a shutdown procedure or a curtailment procedure of the wind turbine 10. During the shutdown procedure or the curtailment procedure of the wind turbine 10, as shown at (204), the method 200 includes dynamically adjusting a rate of change of a rotor speed set point as a function of a rotor-speed tracking error. As mentioned, the rotor-speed tracking error corresponds to a difference between an actual rotor speed of the wind turbine and the rotor speed set point (e.g. the measured rotor speed minus the rotor speed set point). Thus, the method 200 provides a mechanism for safe reduction of the rotor speed, such that the structural loads on the tower 12, main shaft 34, rotor blades 22, and/or other components of the wind turbine 10 are mitigated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:

initiating, via a controller, a shutdown procedure or a curtailment procedure of the wind turbine; and, during the shutdown procedure or the curtailment procedure of the wind turbine, dynamically adjusting a rate of change of a speed set point as a function of a speed tracking error, the speed tracking error being equal to a difference between an actual speed of the wind turbine and a speed set point of the wind turbine, wherein dynamically adjusting the rate of change of the speed set point as a function of the speed tracking error further comprises:

decreasing the rate of change of the speed set point from an initial rate of change to a reduced rate of change when the actual speed is greater than the speed set point, and increasing the reduced rate of change of the speed set point to the initial rate of change when the actual speed approaches the speed set point so as to expedite a stopping of a rotor of the wind turbine.

2. The method of claim 1, wherein the actual speed of the wind turbine comprises the actual rotor speed, the method further comprising determining the actual rotor speed of the wind turbine by measuring, via one or more sensors, a generator speed of the wind turbine and dividing the generator speed by a gearbox ratio of a gearbox of the wind turbine.

3. The method of claim 1, further comprising limiting the decreasing of the rate of change of the speed set point to a predetermined minimum value.

4. The method of claim 1, wherein dynamically adjusting the rate of change of the speed set point as a function of the speed tracking error further comprises maintaining the rate of change of the speed set point at an initial rate of change when the actual speed is equal to the speed set point.

5. The method of claim 1, wherein dynamically adjusting the rate of change of the speed set point as a function of the speed tracking error further comprises maintaining the rate of change of the speed set point at an initial rate of change when the actual speed is less than the speed set point.

6. The method of claim 1, wherein the speed set point comprises at least one of a rotor speed set point, a generator speed set point, or a rotational speed set point within a gearbox of the wind turbine.

7. A system for operating a wind turbine, the system comprising:

a controller having at least one processor, the processor configured to perform a plurality of operations, the plurality of operations comprising:

initiating a shutdown procedure or a curtailment procedure of the wind turbine; and, during the shutdown procedure or the curtailment procedure of the wind turbine, dynamically adjusting a rate of change of the speed set point as a function of a speed tracking error, the speed tracking error corresponding to a difference between an actual speed of the wind turbine and the speed set point, wherein dynamically adjusting the rate of change of the speed set point as a function of the speed tracking error further comprises maintaining the rate of change of the speed set point at an initial rate of change when the actual speed is equal to the speed set point.

8. The system of claim 7, wherein the actual speed of the wind turbine comprises the actual rotor speed, the system further comprising via one or more sensors for measuring a generator speed of the wind turbine, the plurality of operations further comprising determining the actual rotor speed by dividing the generator speed by a gearbox ratio of a gearbox of the wind turbine.

9. The system of claim 7, wherein dynamically adjusting the rate of change of the speed set point as a function of the speed tracking error further comprises decreasing the rate of change of the speed set point from an initial rate of change to a reduced rate of change when the actual speed is greater than the speed set point.

10. The system of claim 9, further comprising limiting the decreasing of the rate of change of the speed set point to a predetermined minimum value.

11. The system of claim 9, further comprising increasing the reduced rate of change of the speed set point to the initial rate of change when the actual speed approaches the speed set point so as to expedite a stopping of a rotor of the wind turbine.

12. The system of claim 7, wherein dynamically adjusting the rate of change of the speed set point as a function of the speed tracking error further comprises maintaining the rate of change of the speed set point at an initial rate of change when the actual speed is less than the speed set point.

13. The system of claim 7, wherein the speed set point comprises at least one of a rotor speed set point, a generator speed set point, or a rotational speed set point within a gearbox of the wind turbine.

14. A method for shutting down or curtailing a wind turbine, the method comprising:
during normal operation of the wind turbine, operating, via a controller, the wind turbine according to a speed set point;
receiving, via the controller, a command to shut down the wind turbine or curtail operation of the wind turbine;
in response to receiving the command, initiating, via the controller, a shutdown procedure or a curtailment procedure of the wind turbine; and,
during the shutdown procedure or the curtailment procedure of the wind turbine, dynamically adjusting a rate of change of a speed set point as a function of a speed tracking error, the speed tracking error corresponding to a difference between an actual rotor speed of the wind turbine and the speed set point,
wherein dynamically adjusting the rate of change of the speed set point as a function of the speed tracking error further comprises increasing the rate of change of the speed set point when the actual rotor speed is less than or equal to the speed set point.

15. The method of claim 14, further comprising determining the actual rotor speed of the wind turbine by measuring, via one or more sensors, a generator speed of the wind turbine and dividing the generator speed by a gearbox ratio of a gearbox of the wind turbine.

16. The method of claim 14, wherein dynamically adjusting the rate of change of the speed set point as a function of the speed tracking error further comprises:
decreasing the rate of change of the speed set point when the actual rotor speed is greater than the speed set point to a predetermined minimum value; and,
increasing the rate of change of the speed set point when the actual rotor speed approaches the speed set point so as to expedite a stopping of a rotor of the wind turbine.

* * * * *